US009237559B2

(12) United States Patent
Inumaru

(10) Patent No.: US 9,237,559 B2
(45) Date of Patent: Jan. 12, 2016

(54) BASE STATION, MOBILE STATION, COMMUNICATION CONTROL SYSTEM, AND COMMUNICATION CONTROL METHOD

(75) Inventor: Tadayoshi Inumaru, Tokyo (JP)

(73) Assignee: NEC CORPORATION, Tokyo (JP)

( * ) Notice: Subject to any disclaimer, the term of this patent is extended or adjusted under 35 U.S.C. 154(b) by 119 days.

(21) Appl. No.: 13/979,949

(22) PCT Filed: Sep. 9, 2011

(86) PCT No.: PCT/JP2011/005088
§ 371 (c)(1),
(2), (4) Date: Jul. 16, 2013

(87) PCT Pub. No.: WO2012/101688
PCT Pub. Date: Aug. 2, 2012

(65) Prior Publication Data
US 2013/0294414 A1 Nov. 7, 2013

(30) Foreign Application Priority Data
Jan. 27, 2011 (JP) .................................. 2011-015181

(51) Int. Cl.
*H04W 4/00* (2009.01)
*H04W 72/04* (2009.01)
(Continued)

(52) U.S. Cl.
CPC .......... *H04W 72/0406* (2013.01); *H04L 5/001* (2013.01); *H04L 5/0042* (2013.01); *H04L 5/0053* (2013.01); *H04L 5/0092* (2013.01); *H04W 36/0055* (2013.01); *H04W 36/08* (2013.01)

(58) Field of Classification Search
None
See application file for complete search history.

(56) References Cited

U.S. PATENT DOCUMENTS

2010/0233962 A1* 9/2010 Johansson et al. ........... 455/63.1
2010/0296389 A1* 11/2010 Khandekar et al. ........... 370/216
(Continued)

FOREIGN PATENT DOCUMENTS

| CN | 101674638 A | 3/2010 |
| EP | 1993307 A2 | 11/2008 |
| JP | 2008-092375 A | 4/2008 |

OTHER PUBLICATIONS

3GPP TS 36.300 V10.0.0, 3rd Generation Partnership Project; Technical Specification Group Radio Access Network; Evolved Universal Terrestrial Radio Access (E-UTRA); and Evolved Universal Terrestrial Radio Access Network (E-UTRAN); Overall description; Stage 2 (release 10), Jun. 2010, pp. 1-183.

(Continued)

*Primary Examiner* — Phirin Sam
(74) *Attorney, Agent, or Firm* — Sughrue Mion, PLLC

(57) ABSTRACT

In order to improve the use efficiency of radio resources upon executing a CA function, a base station (10A) forming a communication control system simultaneously transmits and receives a main carrier (100) and a plurality of sub-carriers (101 and 102) to wirelessly communicate with a mobile station (20). Prior to this, the base station (10A) notifies, to the mobile station (20) through the main carrier (100), first control information (201) for communication using the first sub-carrier (101), and first difference information (401) on a difference between the first control information (201) and second control information (202) for communication using another sub-carrier (102). The mobile station (20) reproduces the second control information (202) by using the first control information (201) and the first difference information (401).

10 Claims, 11 Drawing Sheets

(51) Int. Cl.
*H04L 5/00* (2006.01)
*H04W 36/00* (2009.01)
*H04W 36/08* (2009.01)

(56) References Cited

U.S. PATENT DOCUMENTS

| | | | |
|---|---|---|---|
| 2010/0331037 A1* | 12/2010 | Jen | 455/522 |
| 2011/0002283 A1* | 1/2011 | Drugge et al. | 370/329 |
| 2011/0086662 A1* | 4/2011 | Fong et al. | 455/517 |
| 2011/0111785 A1* | 5/2011 | Lindoff et al. | 455/513 |
| 2011/0243066 A1* | 10/2011 | Nayeb Nazar et al. | 370/328 |
| 2012/0009963 A1* | 1/2012 | Kim et al. | 455/509 |
| 2012/0051306 A1* | 3/2012 | Chung et al. | 370/329 |
| 2012/0106530 A1* | 5/2012 | Drugge et al. | 370/338 |
| 2012/0113962 A1* | 5/2012 | Jen | 370/336 |
| 2012/0140698 A1* | 6/2012 | Noh et al. | 370/315 |
| 2012/0257588 A1* | 10/2012 | Umeda et al. | 370/329 |
| 2012/0275409 A1* | 11/2012 | Han et al. | 370/329 |
| 2012/0300743 A1* | 11/2012 | Kim et al. | 370/329 |
| 2013/0051214 A1* | 2/2013 | Fong et al. | 370/216 |
| 2013/0136069 A1* | 5/2013 | Baldemair et al. | 370/329 |
| 2013/0155868 A1* | 6/2013 | Seo et al. | 370/241 |
| 2013/0201921 A1* | 8/2013 | Chen et al. | 370/329 |
| 2014/0376490 A1* | 12/2014 | McBeath et al. | 370/329 |

OTHER PUBLICATIONS

3GPP TS 36.331 V9.3.0, 3rd Generation Partnership Project; Technical Specification Group Radio Access Network; Evolved Universal Terrestrial Radio Access (E-UTRA); Radio Resource Control (RRC); Protocol specification (release 9), Jun. 2010, pp. 1-250.

3GPP TS 36.423 V9.3.0, 3rd Generation Partnership Project; Technical Specification Group Radio Access Network; Evolved Universal Terrestrial Radio Access Network (E-UTRAN); X2 application protocol (X2AP) (release 9), Jun. 2010, pp. 1-121.

"SCell configuration at handover", LG Electronics Inc, 3GPP TSG-RAN2 Meeting #71bis, R2-105859, Xian, China, Oct. 10-15, 2010, pp. 1-3.

"SCell configuration at SCell addition and HO", Panasonic, 3GPP TSG-RAN WG2 Meeting #71bis, R2-105763, Xi'an, China, Oct. 11-15, 2010, pp. 1-5.

"Discussion on delta signalling", ZTE, 3GPP TSG-RAN WG2 Meeting #71bis, R2-105342, Xi'an, China, Oct. 10-15, 2010, pp. 1-2.

Communication dated Oct. 29, 2015, issued by the State Intellectual Property Office of the P.R.C. in counterpart Chinese Application No. 201180066143.7.

* cited by examiner

| IE/IE GROUP NAME | CONTROL INFORMATION 201 | CONTROL INFORMATION 202 | PRESENCE OR ABSENCE OF DIFFERENCE |
|---|---|---|---|
| ... | | | |
| RadioResourceConfigDedicated | | | |
| > mac-MainConfig | | | |
| >> ul-SCH-Config | | | |
| >>> maxHARQ-Tx | N1 | N1 | ABSENCE |
| >>> periodicBSR-Timer | sf5 | sf5 | ABSENCE |
| >>> retxBSR-Timer | sf320 | sf320 | ABSENCE |
| >>> ttiBundling | false | false | ABSENCE |
| ... | | | |
| > physicalConfigDedicated | | | |
| >> pdsch-ConfigDedicated | | | |
| >>> p-a | dB-6 | dB-3 | PRESENCE |
| ... | | | |
| >> uplinkPowerControlDedicated | | | |
| >> tpc-PDCCH-ConfigPUCCH | | | |
| >>> tpc-RNTI | 1 | 2 | PRESENCE |
| >>> tpc-Index | 10 | 15 | PRESENCE |
| ... | | | |

Fig. 5

| DATA TYPE | USED CARRIER |
|---|---|
| 1 | PCC 100 & SCC 101 |
| 2 | PCC 100 |
| 3 | SCC 101 |
| 4 | PCC 101 |
| 5 | SCC 102 |
| ... | ... |

BASE STATION, MOBILE STATION, COMMUNICATION CONTROL SYSTEM, AND COMMUNICATION CONTROL METHOD

CROSS REFERENCE TO RELATED APPLICATIONS

This application is a National Stage of International Application No. PCT/JP2011/005088, filed on Sep. 9, 2011, which claims priority from Japanese Patent Application No. 2011-015181, filed on Jan. 27, 2011, the contents of all of which are incorporated herein by reference in their entirety.

TECHNICAL FIELD

The present invention relates to a base station, a mobile station, a communication control system, and a communication control method. In particular, the present invention relates to a technique to transmit control information for communication using a plurality of carriers upon executing a CA (Carrier Aggregation) function.

BACKGROUND ART

In LTE (Long Term Evolution) systems, the introduction of CA function has been considered. As disclosed in NPL 1, the CA function indicates a function of multiplexing a plurality of carriers (Component Carriers) to be used for communication, thereby improving a communication speed between a base station (eNB: evolved Node B) and a mobile station (UE: User Equipment).

Further, in Group 2 of RAN Working Group which is one of standards bodies participating in 3GPP (3rd Generation Partnership Project), it has been considered that broadcast information, which is a part of control information for communication using a sub-carrier (SCC: Secondary Component Carrier), is notified with being included in an RRC (Radio Resource Control) message transmitted on a main carrier (PCC: Primary Component Carrier). Note that NPL 2 defines the specification of RRC protocol, and NPL 3 defines the specification of X2-AP (X2 Application Protocol). The term "X2" means an interface (transmission path) between eNBs.

CITATION LIST

Non Patent Literature

NPL 1: 3GPP TS 36.300, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", v10.0.0, 2010-06
NPL 2: 3GPP TS 36.331, "Technical Specification Group Radio Access Network; Evolved Universal Terrestrial Radio Access (E-UTRA); Radio Resource Control (RRC); Protocol specification (Release 9)", v9.3.0, 2010-06
NPL 3: 3GPP TS 36.423, "Technical Specification Group Radio Access Network; Evolved Universal Terrestrial Radio Access (E-UTRA); X2 application protocol (X2AP) (Release 9)", v9.3.0, 2010-06

Patent Literature

PTL 1: Japanese Unexamined Patent Application Publication No. 2008-92375

SUMMARY OF INVENTION

Technical Problem

However, there is a problem that the introduction of CA function may lead to a reduction in the use efficiency of radio resources. This is because every time a sub-carrier is added or modified, control information thereof is transmitted on a main carrier.

Note that PTL 1 discloses a base station that notifies, in a case of increasing the bandwidth of a shared channel allocated to a mobile station, the mobile station of control information on the increased band. However, the notification of the control information on the increased band is equivalent to the notification of the control information on the sub-carrier added by the CA function. Therefore, the technique disclosed in PTL 1 cannot at all improve the use efficiency of radio resources upon executing the CA function.

Accordingly, an exemplary object of the present invention is to improve the use efficiency of radio resources upon executing a CA function.

Solution to Problem

In order to achieve the above-mentioned object, a base station according to a first exemplary aspect of the present invention includes: a first radio communicator that simultaneously transmits and receives a main carrier and at least a part of a plurality of sub-carriers to wirelessly communicate with a mobile station; and a controller that controls the first radio communicator. The controller is configured to cause the first communicator to notify, to the mobile station through the main carrier, first control information for communication using a first sub-carrier, and first difference information on a difference between the first control information and second control information for communication using each of other sub-carriers.

Further, a mobile station according to a second exemplary aspect of the present invention includes: a communicator that simultaneously transmits and receives a main carrier and a plurality of sub-carriers to wirelessly communicate with one or more base stations; and a controller that controls the communicator. The controller is configured to: receive, from one base station through the main carrier, first control information for communication using a first sub-carrier, and first difference information on a difference between the first control information and second control information for communication using each of other sub-carriers; and reproduce the second control information by using the first control information and the first difference information.

Further, a communication control system according to a third exemplary aspect of the present invention includes: a first base station; and a mobile station that simultaneously transmits and receives a main carrier and a plurality of sub-carriers to wirelessly communicate with at least the first base station. The first base station notifies, to the mobile station through the main carrier, first control information for communication using a first sub-carrier, and first difference information on a difference between the first control information and second control information for communication using each of other sub-carriers. The mobile station reproduces the second control information by using the first control information and the first difference information.

Further, a communication control method according to a fourth exemplary aspect of the present invention provides a method of controlling communication in a base station that simultaneously transmits and receives a main carrier and at least a part of a plurality of sub-carriers to wirelessly communicate with a mobile station. This method includes: notifying, to the mobile station through the main carrier, first control information for communication using a first sub-carrier, and first difference information on a difference between the first control information and second control information for communication using each of other sub-carriers.

Furthermore, a communication control method according to a fifth exemplary aspect of the present invention provides a method of controlling communication in a mobile station that simultaneously transmits and receives a main carrier and a plurality of sub-carriers to wirelessly communicate with one or more base stations. This method includes: receiving, from one base station through the main carrier, first control information for communication using a first sub-carrier, and first difference information on a difference between the first control information and second control information for communication using each of other sub-carriers; and reproducing the second control information by using the first control information and the first difference information.

Advantageous Effects of Invention

According to the present invention, it is possible to improve the use efficiency of radio resources upon executing a CA function. This is because the size of information that is notified to a mobile station as a result of addition or modification of a sub-carrier is greatly reduced as compared with the related art.

BRIEF DESCRIPTION OF DRAWINGS

FIG. 5 is a diagram showing an example of a result obtained by checking a difference between pieces of control information in the base station according to the first exemplary embodiment of the present invention;

FIG. 11 is a diagram showing a configuration example of a table for determining used carriers, which is used in a base station according to the third exemplary embodiment of the present invention.

DESCRIPTION OF EMBODIMENTS

Figure 1:
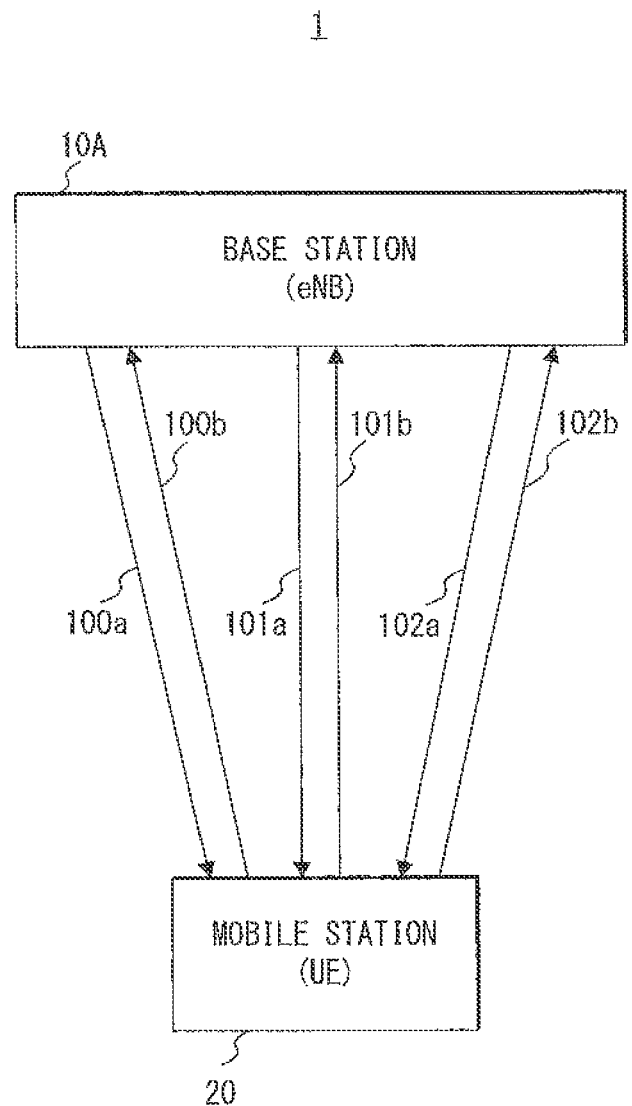
FIG. 1 is a block diagram showing a configuration example of a communication control system according to a first exemplary embodiment of the present invention.

Hereinafter, first to third exemplary embodiments of a base station and a mobile station according to the present invention, and a communication control system to which these base station and mobile station are applied will be described with reference to FIGS. 1 to 11. Note that in the drawings, the identical reference symbols denote identical elements and the redundant explanation thereof will be omitted as appropriate to clarify the explanation.

First Exemplary Embodiment

As shown in FIG. 1, a communication control system 1 according to this exemplary embodiment includes a base station 10A and a mobile station 20. The base station 10A and the mobile station 20 correspond to e.g., an eNB and a UE, respectively, in an LTE system.

In the example shown in FIG. 1, a plurality of carriers 100a, 100b, 101a, 101b, 102a and 102a are transmitted and received between the base station 10A and the mobile station 20. Note that in the following explanation, the phrase as "transmitting and receiving carriers" means that desired signals are transmitted and received through the carriers.

Figure 2:
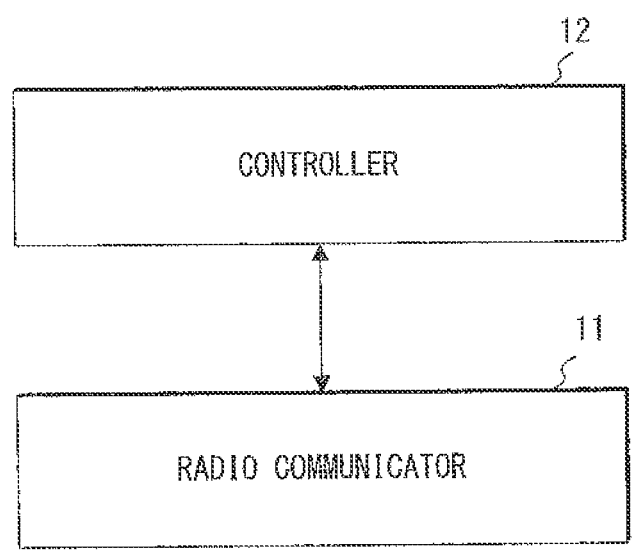
FIG. 2 is a block diagram showing a configuration example of a base station according to the first exemplary embodiment of the present invention.

The carrier 100a is a PCC transmitted in a downlink direction from the base station 10A toward the mobile station 20. On the other hand, the carrier 100b is a PCC transmitted in an uplink direction from the mobile station 20 toward the base station 10A. Further, the carrier 101a is a first SCC transmitted in the downlink direction. On the other hand, the carrier 101b is a first SCC transmitted in the uplink direction. Furthermore, the carrier 102a is a second SCC transmitted in the downlink direction. On the other hand, the carrier 102b is a second SCC transmitted in the uplink direction. Note that in the following explanation, the carriers 100a and 100b are also collectively referred to by using a reference numeral "100". Similarly, the carriers 101a and 101b are also collectively referred to by using a reference numeral "101". The carriers 102a and 102b are also collectively referred to by using a reference numeral "102". Further, there may be three or more SCCs transmitted and received between the base station 10A and the mobile station 20. In this case, the following explanation can also be similarly applied Further, as shown in FIG. 2, the base station 10A includes a radio communicator 11 and a controller 12. The radio communicator 11 serves as a radio interface to the mobile station 20, and thus simultaneously transmits and receives the PCC and the SCCs. The controller 12 controls the radio communicator 11, thereby implementing a CA function which will be described later.

Figure 3:
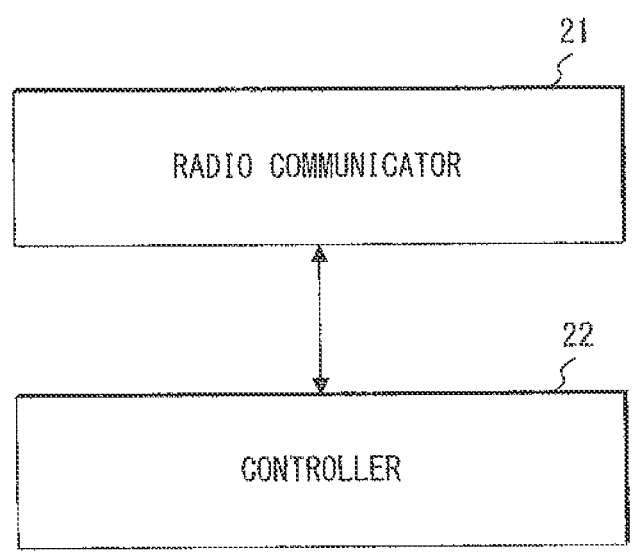
FIG. 3 is a block diagram showing a configuration example of a mobile station according to the first exemplary embodiment of the present invention.

On the other hand, as shown in FIG. 3, the mobile station 20 includes a radio communicator 21 and a controller 22. The radio communicator 21 serves as a radio interface to the base station 10A, and thus simultaneously transmits and receives the PCC and the SCCs. The controller 22 controls the radio communicator 21, thereby implementing the CA function which will be described later.

Next, operations of this exemplary embodiment will be described in detail with reference to FIGS. 4 and 5.

Figure 4:
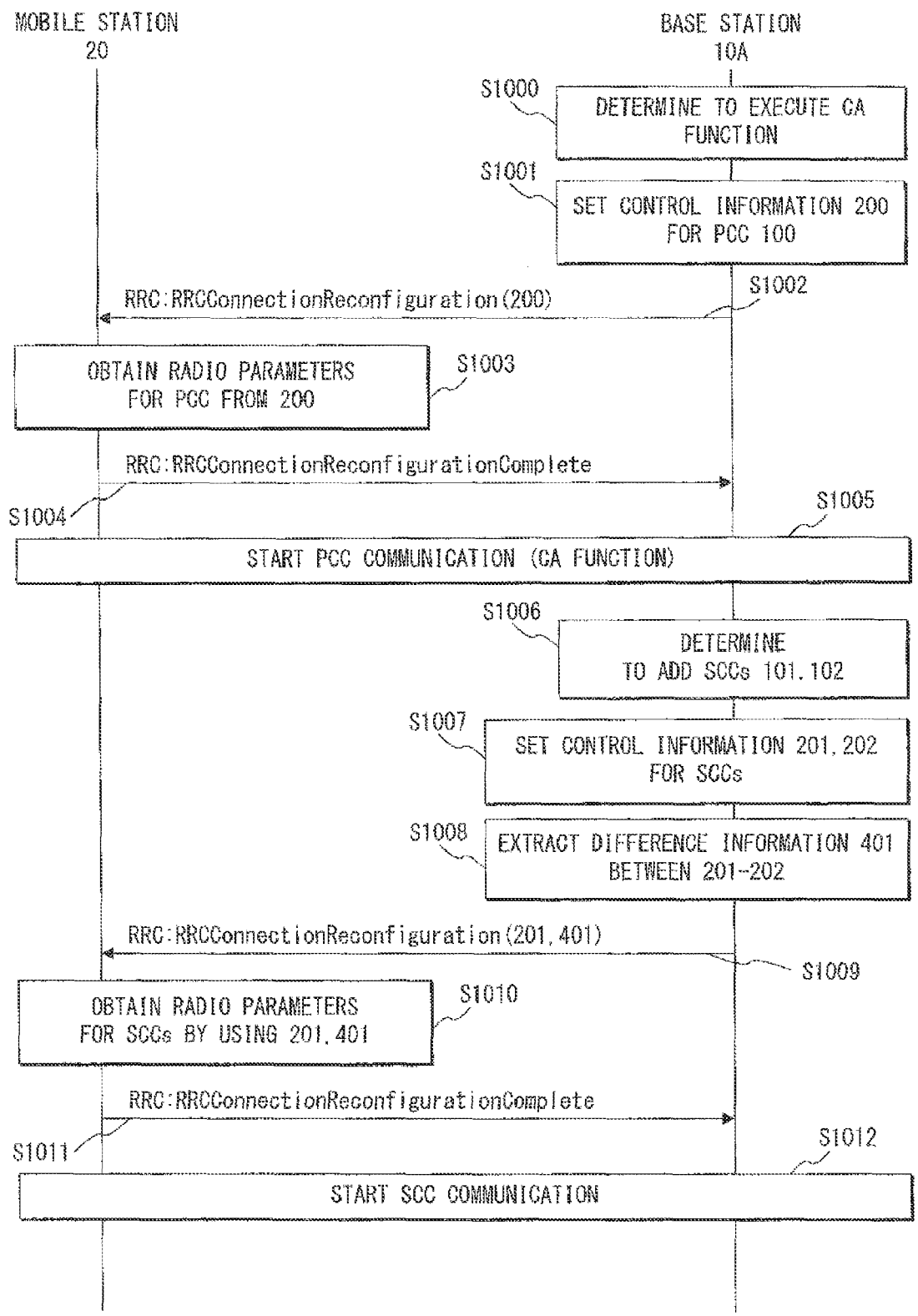
FIG. 4 is a sequence diagram showing an example of procedures to execute a CA function in the communication control system according to the first exemplary embodiment of the present invention.

As shown in FIG. 4, the base station 10A determines to execute the CA function (Step S1000), and then sets control information 200 for communication using the PCC 100 (Step S1001). Specifically, the base station 10A includes, in the control information 200, an identifier which indicates starting of the CA function. Further, the base station 10A includes, in the control information 200, radioResourceConfigDedicated as radio parameters for the PCC 100.

Then, the base station 10A includes the control information 200 in RRCConnectionReconfiguration which is one of RRC messages, and notifies it to the mobile station 20 (Step S1002). Note that in the following explanation, an arbitrary RRC message will be represented as "RRC:XXX (XXX is an arbitrary character string)".

The mobile station 20 receives the RRC:RRCConnectionReconfiguration message, and then obtains the radio parameters for the PCC 100 from the control information 200 (Step S1003). Further, the mobile station 20 transmits, to the base station 10A, an RRC:RRCConnectionReconfigurationComplete message (Step S1004). Thus, there is started the CA function using the carriers 100a and 100b shown in FIG. 1 as the PCC (Step S1005).

After that, the base station 10A determines to add the SCCs 101 and 102 (Step S1006), and then sets control information 201 and 202 used for communication using the SCCs 101 and 102, respectively (Step S1007). Specifically, the base station 10A includes, in each of the control information 201 and 202, an identifier for distinguishing each SCC (e.g., a value of the carrier frequency of each SCC). Further, the base station 10A includes, in each of the control information 201 and 202, IEs (Information Elements) required as radio parameters for each SCC among radioResourceConfigDedicated and redioResourceConfigCommon. Note that it is preferable that the base station 10A selects as an object to be added an SCC having good communication quality, by using a measurement result notified from the mobile station 20.

Then, the base station 10A extracts difference information 401 on a difference between the control information 201 and 202 (Step S1008). Specifically, as shown in FIG. 5, the base station 10A checks the presence or absence of the difference between the control information 201 and 202 for each IE group in the radioResourceConfigDedicated, and thus extracts IEs or IE groups having the difference as the difference information 401. Note that although the illustration is omitted, the base station 10A similarly checks the presence or absence of the difference with respect to the redioResourceConfigCommon, and thus extracts IEs or IE groups having the difference as the difference information 401. Further, in a case where there are three or more SCCs. the base station 10A similarly extracts difference information on a difference between the control information 201 and control information for communication using each extra SCC.

Then, the base station 10A includes the control information 201 and the difference information 401 in an RRC:RRCConnectionReconfiguration message, and notifies it to the mobile station 20 (Step S1009).

The mobile station 20 receives the RRC:RRCConnectionReconfiguration message, and then obtains the radio parameters for the SCCs 101 and 102 by using the control information 201 and the difference information 401 (Step S1010). Specifically, the mobile station 20 obtains the radio parameters for the SCC 101 from the control information 201. Further, the mobile station 20 reproduces the control information 202 by using the control information 201 and the difference information 401, and then obtains the radio parameters for the SCC 102 from the reproduced control information 202.

Then, the mobile station 20 transmits, to the base station 10A, an RRC:RRCConnectionReconfigurationComplete message (Step S1011). Thus, there is started communication using each of the carriers 101a, 101b, 102a and 102b which are the SCCs shown in FIG. 1 (Step S1012).

Note that the example shown in FIG. 4 deals with the case of adding the SCC. However, even in a case of modifying radio parameters for an SCC which has been already transmitted and received between the base station 10A and the mobile station 20, control information on this SCC can be reproduced by using difference information on a difference from control information on another SCC.

In this way, the size of difference information that is notified to the mobile station as a result of addition or modification of the SCC is much smaller than that of control information. Therefore, in this exemplary embodiment, the PCC can be efficiently used, so that it is possible to greatly improve the use efficiency of radio resources. Further, in the case of multiplexing the control information and the difference information as shown at the above-mentioned Step S1009 and of including the multiplexed information in the RRC message to be notified to the mobile station, it is possible to improve the use efficiency of radio resources even further.

Second Exemplary Embodiment

Figure 6:
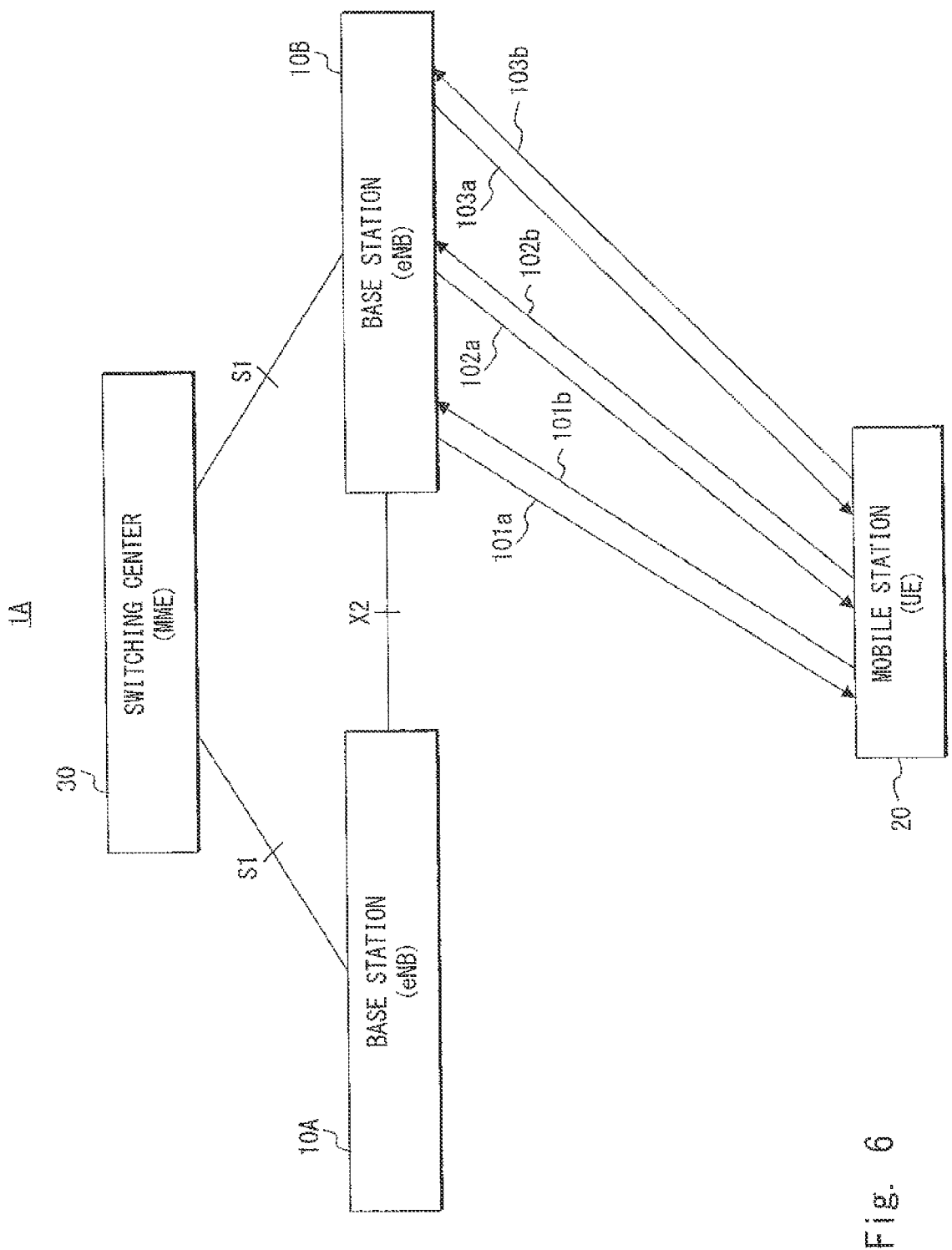
FIG. 6 is a block diagram showing a configuration example of a communication control system according to a second exemplary embodiment of the present invention.

As shown in FIG. 6, a communication control system 1A according to this exemplary embodiment includes a base station 10B and a switching center 30 in addition to the base station 10A and the mobile station 20A shown in FIG. 1. Among them, the base station 10B is a base station which is placed adjacent to the base station 10A, and corresponds to e.g., an eNB in the LTE system. The base stations 10A and 10B are connected to each other through an X2 transmission path. On the other hand, the switching center 30 corresponds to e.g., an MME (Mobility Management Entity) in the LTE system. The switching center 30 is connected to each of the base stations 10A and 10B through an S1 transmission path. Note that the term "S1" means an interface between the eNB and the MME.

The example shown in FIG. 6 deals with a case where the base station 10B continuously uses as the PCC the carriers 101a and 101b which has been used by the base station 10A as shown in FIG. 1, continuously uses as a first SCC the carriers 102a and 102b which has been used by the base station 10A, and newly adds as a second SCC carriers 103a and 103b. The carrier 103a is an SCC transmitted in a downlink direction from the base station 10B toward the mobile station 20. On the other hand, the carrier 103b is a PCC transmitted in an uplink direction from the mobile station 20 toward the base station 10B. Note that in the following explanation, the carriers 103a and 103b are also collectively referred to by using a reference numeral "103". Further, the base station 10B may add two or more SCCs. In this case, the following explanation can also be similarly applied.

Figure 7:
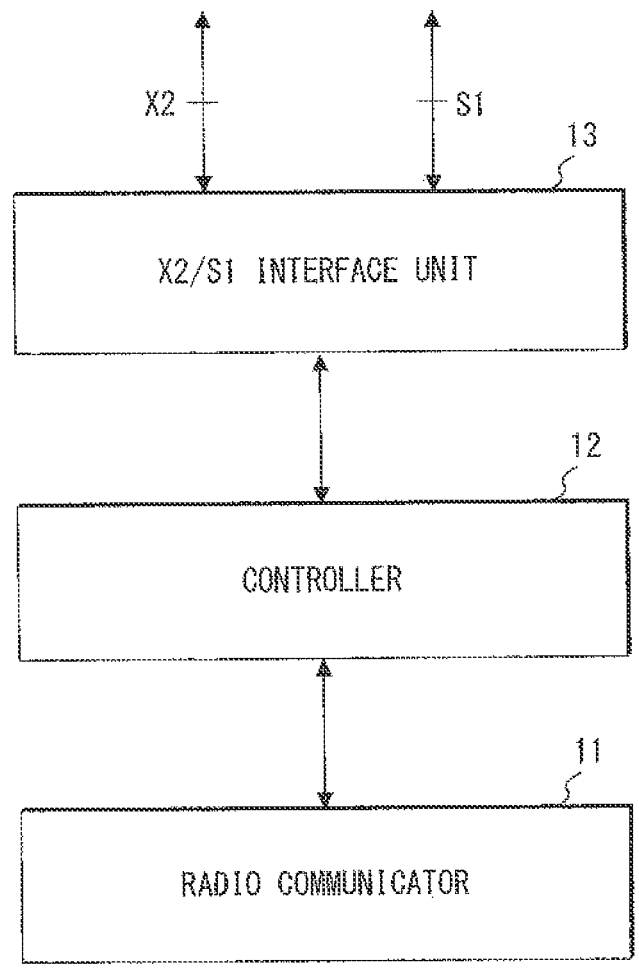
FIG. 7 is a block diagram showing a configuration example of a base station according to the second exemplary embodiment of the present invention.

Further, as shown in FIG. 7, each of the base stations 10A and 10B includes an X2/S1 interface unit 13 in addition to the radio communicator 11 and the controller 12 shown in FIG. 2. The X2/S1 interface 13 communicates with a neighboring base station through the X2 transmission path or the S1 transmission path, under control of the controller 12.

Next, operations of this exemplary embodiment will be described in detail with reference to FIG. 8.

Figure 8:
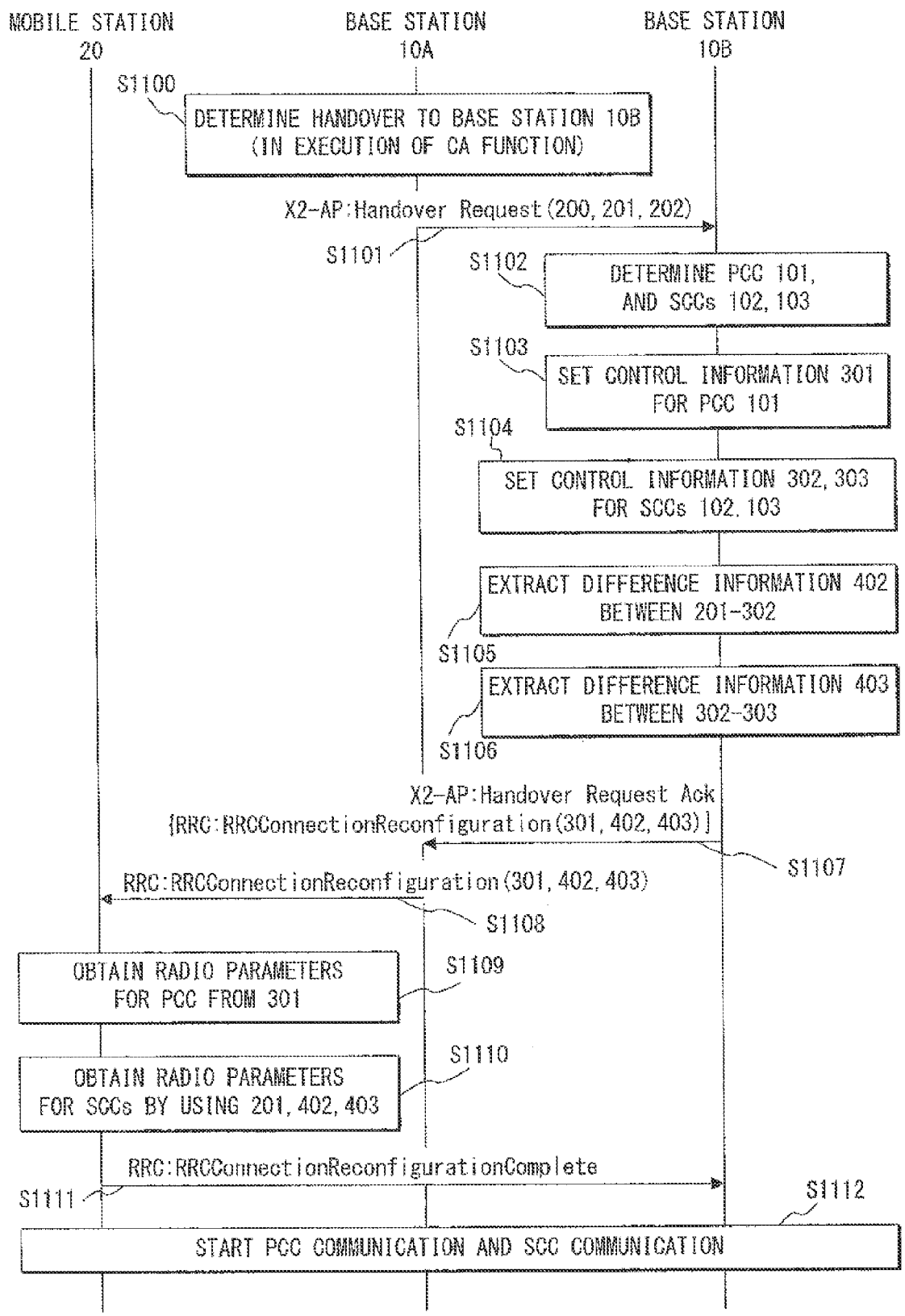
FIG. 8 is a sequence diagram showing an example of procedures to execute the CA function in the communication control system according to the second exemplary embodiment of the present invention.

As shown in FIG. 8, if the mobile station 20 is moving from a communication area formed by the base station 10A to a communication area formed by the base station 10B, the base station 10A, which has communicated with the mobile station 20 by using the CA function, determines to hand over the mobile station 20 to the base station 10B (Step S1100). Note that the base station 10A detects that the mobile station 20 moves to the communication area formed by the base station 10B based on e.g., a measurement result regarding the neighboring base station, which is notified from the mobile station 20.

Then, the base station 10A transmits, to the base station 10B as the handover destination, Handover Request which is one of X2-AP messages (Step S1101). The base station 10A includes, in the Handover Request message, the control information 200, 201 and 202 on the PCC and the SCCs which have been used for the communication with the mobile station 20. Note that in the following explanation, an arbitrary X2-AP message will be represented as "X2-AP:XXX".

The base station 10B receives the X2-AP:Handover Request message, and then determines to use the PCC 101, and the SCCs 102 and 103 (Step S1102).

At this time, the base station 10B sets control information 301 for communication using the PCC 101 (Step S1103), and sets control information 302 and 303 for communication using the SCCs 102 and 103, respectively (Step S1104).

Further, the base station 10B extracts difference information 402 on a difference the control information 302 and the control information 201 on the SCC 101, which has been notified from the base station 10A (Step S1105). Furthermore, the base station 10B extracts difference information 403 on a difference between the control information 302 and 303 (Step S1106).

Then, the base station 10B transmits, as a response to the X2-AP:Handover Request message, an X2-AP:Handover Request Ack message to the base station 10A (Step S1107). The base station 10B includes an RRC:RRCConnectionReconfiguration message in the X2-AP:Handover Request Ack message. Further, the base station 10B includes, in the RRC:RRCConnectionReconfiguration message, the control information 301, and the difference information 402 and 403.

The base station 10A, which has received the X2-AP:Handover Request Ack message, obtains the RRC:RRCConnectionReconfiguration message from the X2-AP:Handover Request Ack message, and notifies the RRC:RRCConnectionReconfiguration message to the mobile station 20 (Step S1108).

Note that these messages regarding the handover may be transmitted and received through the 51 transmission path (switching center 30).

The mobile station 20 receives the RRC:RRCConnectionReconfiguration message, and then obtains the radio parameters for the PCC 101 from the control information 301 (Step S1109).

Further, the mobile station 20 obtains radio parameters for the SCCs 102 and 103 by using the control information 201 which has been received from the base station 10A at Step S1009 shown in FIG. 4, and the difference information 402 and 403 (Step S1110). Specifically, the mobile station 20 reproduces the control information 302 by using the control information 201 and the difference information 402, and reproduces the control information 304 by using the control information 302 and the difference information 403. Then, the mobile station 20 obtains the radio parameters for the SCCs 102 and 103 from the reproduced control information 302 and 304.

Then, the mobile station 20 transmits, to the base station 10A, an RRC:RRCConnectionReconfigurationComplete message (Step S1111). Thus, there is started communication using each of the carriers 101a and 101b as the PCC, and carriers 102a, 102b, 103a and 103b as the SCCs, which are shown in FIG. 6 (Step S1112).

As described above, in this exemplary embodiment, the PCC can be efficiently used even in the case of modifying or adding the SCC upon the handover, so that it is possible to improve the use efficiency of radio resources even further.

Third Exemplary Embodiment

Figure 9:
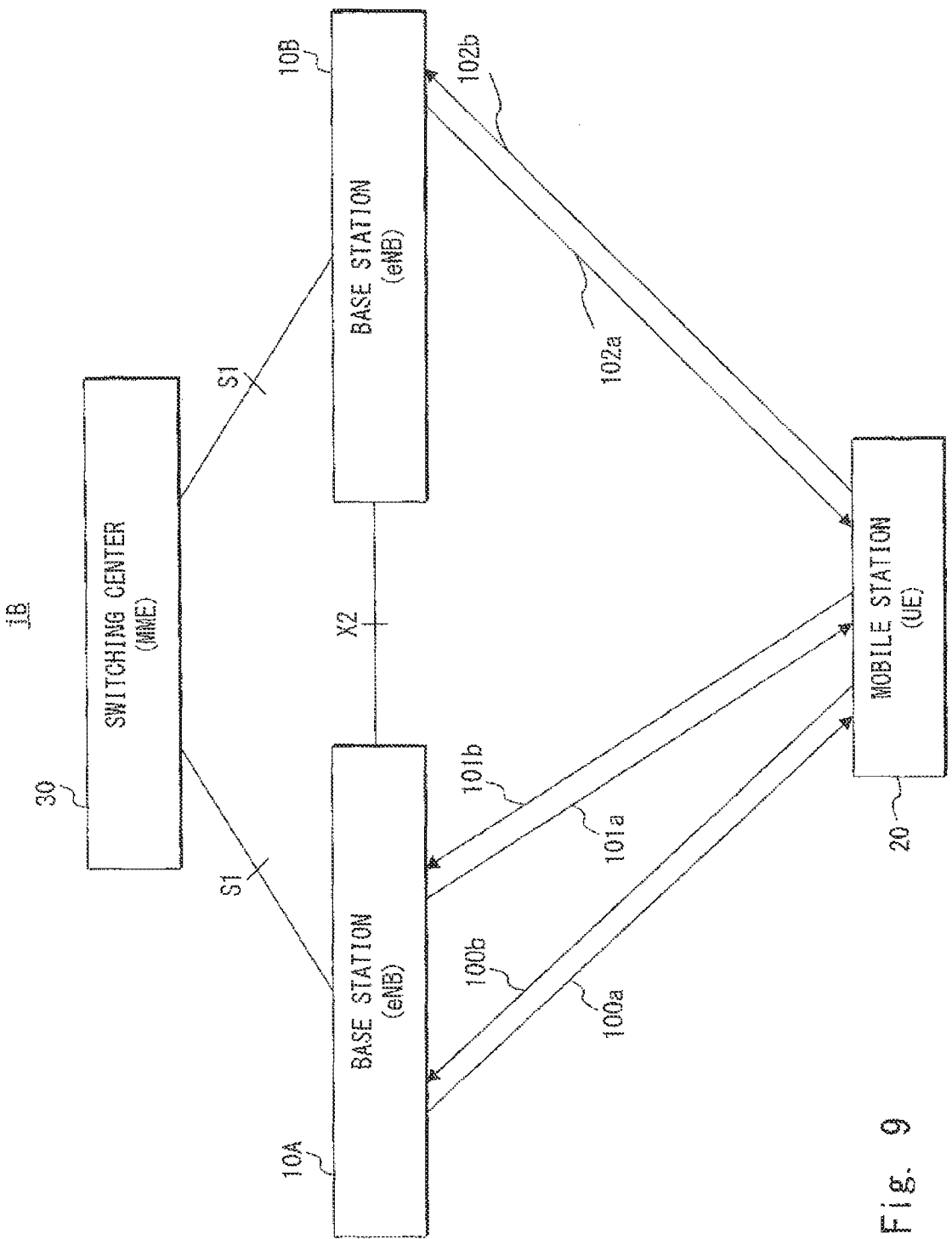
FIG. 9 is a block diagram showing a configuration example of a communication control system according to a third exemplary embodiment of the present invention.

As shown in FIG. 9, a communication control system 1B according to this exemplary embodiment can be configured in a similar manner to the communication control system 1A shown in FIG. 6. Further, each of the base stations 10A and 10B can be configured in a similar manner to that shown in FIG. 7. Meanwhile, the example shown in FIG. 9 deals with a case where the base station 10A uses the PCC 100a and 100b, and partial SCC 101a and 101b, and the base station 10B uses the remaining SCC 102a and 102b. Note that a plurality of SCCs may be transmitted and received between the mobile station 20 and each of the base stations 10A and 10B. In this case, the following explanation can also be similarly applied.

Hereinafter, operations of this exemplary embodiment will be described in detail with reference to FIGS. 10 and 11.

Figure 10:
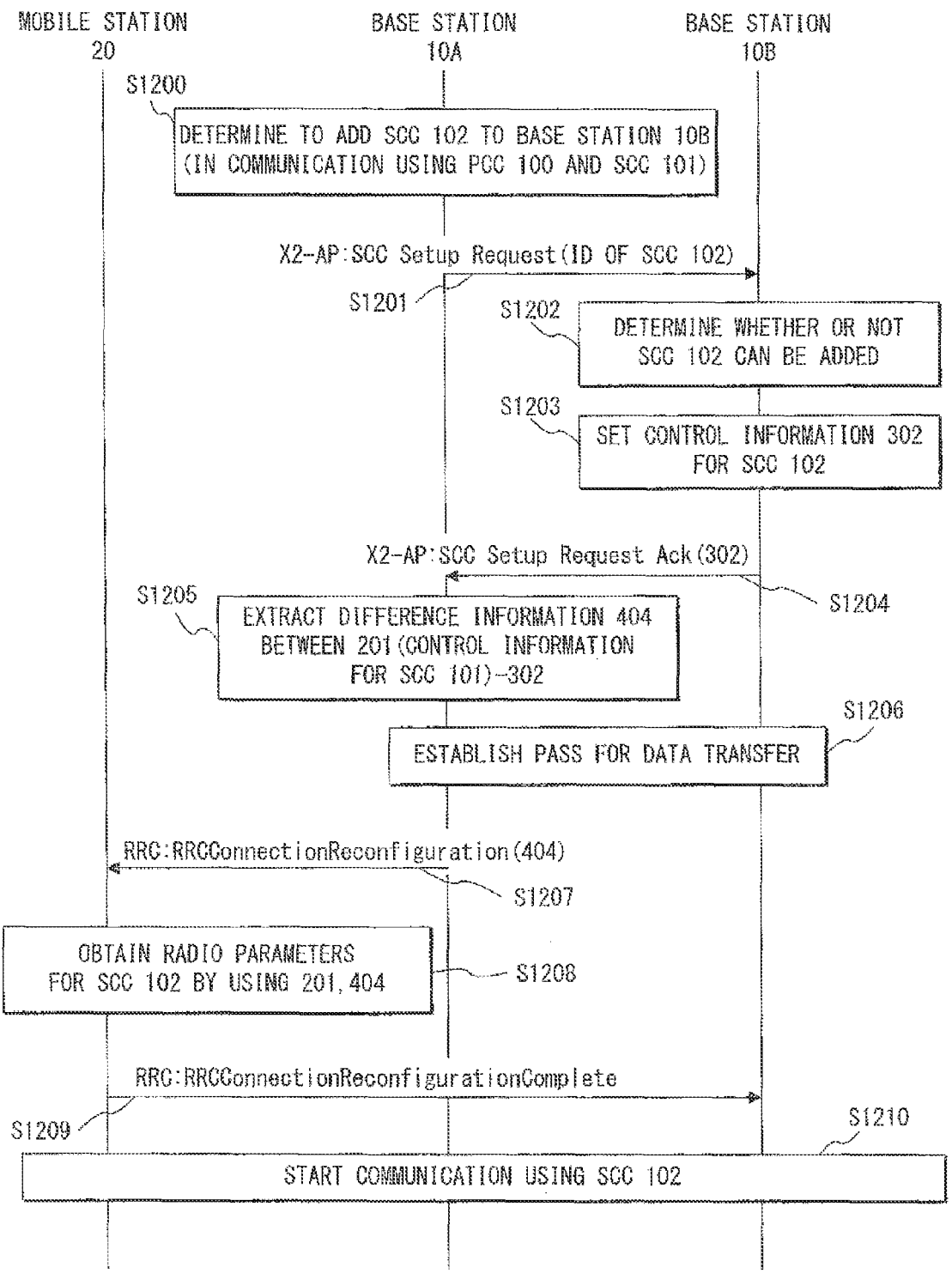
FIG. 10 is a sequence diagram showing an example of procedures to execute the CA function in the communication control system according to the third exemplary embodiment of the present invention.

As shown in FIG. 10, the base station 10A, which has communicated with the mobile station 20 by using the CA function (the PCC 100 and the SCC 101), determines to newly add the SCC 102 to the base station 10B (Step S1200). Note that the base station 10A determines whether or not the SCC 102 can be added based on e.g., a measurement result regarding a neighboring base station, which is notified from the mobile station 20.

Then, the base station 10A transmits, to the base station 10B, an X2-AP:SCC Setup Request message (Step S1201). The base station 10A includes, in the X2-AP:SCC Setup Request message, an identifier for distinguishing the SCC 102 (e.g., a value of the carrier frequency of the SCC 102). Further, the base station 10A also includes, in the X2-AP:SCC Setup Request message, an identifier of a transmission path (X2 or S1) for causing the base station 10B to transfer data received from the mobile station 20 through the SCC 102 to the base station 10A.

The base station 10B receives the X2-AP:SCC Setup Request message, and then determines whether or not the SCC 102 can be added (Step S1202). If the SCS 102 can be added, the base station 10B sets control information 302 for communication using the SCC 102 (Step S1203).

Then, the base station 10B transmits, as a response to the X2-AP:SCC Setup Request message, an X2-AP:SCC Setup Request Ack message to the base station 10A. The base station 10B includes the control information 302 in the X2-AP:SCC Setup Request Ack message. Further, the bases station 10B also includes, in the X2-AP:SCC Setup Request Ack message, an identifier of a transmission path (X2 or S1) for transferring, from the base station 10A to the base station 10B, data to be transmitted to the mobile station 20 through the SCC 102.

The base station 10A which has received the X2-AP:SCC Setup Request Ack message, extracts difference information 404 on a difference between the control information 201 on the SCC 101 used by the base station 10A itself, and the control information 302 received from the base station 10B (Step S1205).

Note that the base station 10B may extract the difference information 404. In this case, the base station 10A may include the control information 201 in the X2-AP:SCC Setup Request message. Further, the base station 10A may set the control information 302. In this case, the base station 10A may include the control information 302 set by the base station 10A itself in the X2-AP:SCC Setup Request message, and determines that the base station 10B has accepted the control information 302 when the X2-AP:SCC Setup Request Ack message is received.

Further, messages regarding the addition of the SCC may be transmitted and received through the S1 transmission path (switching center 30).

Then, the base stations 10A and 10B establish a data transfer path by using the above-mentioned identifier of the transmission path (Step S1206).

After that, the base station 10A includes the difference information 404 in an RRCConnectionReconfiguration message to be notified to the mobile station 20 (Step S1207).

The mobile station 20 receives the RRCConnectionReconfiguration message, and then obtains the radio parameters for the SCC 102 by using the control information 201 and the difference information 404 (Step S1208). Specifically, the mobile station 20 reproduces the control information 302 by using the control information 201 and the difference information 404, and then obtains the radio parameters for the SCC 102 from the reproduced control information 302.

Then, the mobile station 20 transmits, to the base station 10A, an RRC:RRCConnectionReconfigurationComplete message (Step S1209). Thus, there is started communication using the carriers 102a and 102b as the added SCC (Step S1210).

Note that the example shown in FIG. 10 deals with the case of adding the SCC. However, even in a case of modifying radio parameters for an SCC which has been already transmitted and received between the base station 10B and the mobile station 20, control information on this SCC can be reproduced by using difference information on a difference from control information on another SCC.

Further, each of the base stations 10A and 10B relays data between the mobile station 20 and the switching center 30, in accordance with a table 500 for determining used carriers shown in FIG. 11. The table 500 preliminarily stores a plurality of types of data such as voice data and image data in association with carriers to be used in accordance with the types of data. Note that for the purpose of reducing transmission delay and loss, or the like, the table 500 may be configured such that the same type of data is relayed by using the same carrier, or such that data having higher priority is relayed by using a carrier having higher quality (static quality preliminarily measured).

As described above, in this exemplary embodiment, the PCC can be efficiently used even in the case of executing the CA function between the mobile station and the plurality of base stations, so that it is possible to improve the use efficiency of radio resources even further.

Note that the present invention is not limited to the above-mentioned exemplary embodiments, and it will be understood by those of ordinary skill in the art that various changes in form and details may be made therein without departing from the spirit and scope of the present invention as defined by the claims.

This application is based upon and claims the benefit of priority from Japanese patent application No. 2011-015181, filed on Jan. 27, 2011, the disclosure of which is incorporated herein in its entirety by reference.

INDUSTRIAL APPLICABILITY

The present invention can be applied to a base station, a mobile station, a communication control system, and a communication control method. In particular, the present invention can be applied for the purpose of transmitting control information for communication using a plurality of carriers upon executing a CA function.

The whole or part of the exemplary embodiments disclosed above can be described as, but not limited to, the following supplementary notes.

(Supplementary Note 1)

A base station comprising:

a first radio communicator that simultaneously transmits and receives a main carrier and at least a part of a plurality of sub-carriers to wirelessly communicate with a mobile station; and a controller that controls the first radio communicator, wherein the controller is configured to cause the first communicator to notify, to the mobile station through the main carrier, first control information for communication using a first sub-carrier, and first difference information on a difference between the first control information and second control information for communication using each of other sub-carriers.

(Supplementary Note 2)

The base station according to Supplementary note 1, wherein the controller is configured to cause, in a case of starting to simultaneously transmit and receive the plurality of sub-carriers, the first communicator to multiplex the first control information and the first difference information to be notified to the mobile station.

(Supplementary Note 3)

The base station according to Supplementary note 1 or 2, further comprising:

a second communicator that is controlled by the controller, and that communicates with a different base station placed adjacent to the base station itself, wherein the controller is configured to:

acquire, in a case of handing over the mobile station to the different base station and of causing the different base station to continuously use one sub-carrier used by the base station itself, second difference information on a difference between the first control information and third control information through the second communicator, the third control information being set by the different base station for communication using the one sub-carrier; and cause the first communicator to notify the second difference information to the mobile station through the main carrier.

(Supplementary Note 4)

The base station according to Supplementary note 3, wherein the controller is configured to:

acquire, when a sub-carrier is newly added by the different base station upon the handover, third difference information on a difference between the third control information and fourth control information through the second communicator, the fourth control information being set by the different base station for communication using the added sub-carrier; and cause the first communicator to notify the third difference information to the mobile station through the main carrier.

(Supplementary Note 5)

The base station according to Supplementary note 1 or 2, further comprising:

a second communicator that is controlled by the controller, and that communicates with a different base station placed adjacent to the base station itself, wherein the controller is configured to:

cause, when the mobile station is located in an area where the mobile station can communicate with both of the base station itself and the different base station, the first communicator to transmit and receive a part of the plurality of sub-carriers to and from the mobile station; and instruct, through the second communicator, the different base station to transmit and receive remaining sub-carriers to and from the mobile station.

(Supplementary Note 6)

The base station according to Supplementary note 5, wherein the controller is configured to select, in accordance with a type of data to be relayed between the mobile station and a switching center, carriers used for the relay from among the main carrier and the plurality of sub-carriers.

(Supplementary Note 7)

The base station according to Supplementary note 6, wherein when the remaining sub-carriers are selected, the controller is configured to cause the second communicator to:
transfer, to the different base station, data to be transmitted to the mobile station through the remaining sub-carriers; and
acquire data received by the different base station from the mobile station through the remaining sub-carriers.

(Supplementary Note 8)

A mobile station comprising:
a communicator that simultaneously transmits and receives a main carrier and a plurality of sub-carriers to wirelessly communicate with one or more base stations; and
a controller that controls the communicator,
wherein the controller is configured to:
receive, from one base station through the main carrier, first control information for communication using a first sub-carrier, and first difference information on a difference between the first control information and second control information for communication using each of other sub-carriers; and
reproduce the second control information by using the first control information and the first difference information.

(Supplementary Note 9)

The mobile station according to Supplementary note 8,
wherein the communicator is configured to receive, when the mobile station is handed over to a different base station placed adjacent to the one base station and when the different base station continuously use one sub-carrier used by the one base station, second difference information on a difference between the first control information and third control information from the one base station through the main carrier, the third control information being set by the different base station for communication using the one sub-carrier, and
wherein the controller is configured to reproduce the third control information by using the first control information and the second difference information.

(Supplementary Note 10)

The mobile station according to Supplementary note 9,
wherein the communicator is configured to receive, when a sub-carrier is newly added by the different base station upon the handover, third difference information on a difference between the third control information and fourth control information from the one base station through the main carrier, the fourth control information being set by the different base station for communication using the added sub-carrier and
wherein the controller is configured to reproduce the fourth control information by using the third control information and the third difference information.

(Supplementary Note 11)

The mobile station according to Supplementary note 8, wherein when the mobile station is located in an area where the mobile station can communicate with both of the one base station and a different base station placed adjacent to the one base station, the communicator is configured to:
transmit and receive a part of the plurality of sub-carriers to and from the one base station; and
transmit and receive remaining sub-carriers to and from the different base station.

(Supplementary Note 12)

A communication control system comprising:
a first base station; and
a mobile station that simultaneously transmits and receives a main carrier and a plurality of sub-carriers to wirelessly communicate with at least the first base station,
wherein the first base station notifies, to the mobile station through the main carrier, first control information for communication using a first sub-carrier, and first difference information on a difference between the first control information and second control information for communication using each of other sub-carriers, and
wherein the mobile station reproduces the second control information by using the first control information and the first difference information.

(Supplementary Note 13)

The communication control system according to Supplementary note 12, wherein the first base station multiplexes, in a case of starting to simultaneously transmit and receive the plurality of sub-carriers, the first control information and the first difference information to be notified to the mobile station.

(Supplementary Note 14)

The communication control system according to Supplementary note 12 or 13, further comprising:
a second base station that is placed adjacent to the first base station,
wherein the first base station notifies, in a case of handing over the mobile station to the second base station and of causing the second base station to continuously use one sub-carrier used by the first base station, second difference information on a difference between the first control information and third control information to the mobile station through the main carrier, the third control information being set by the second base station for communication using the one sub-carrier and
wherein the mobile station reproduces the third control information by using the first control information and the second difference information.

(Supplementary Note 15)

The communication control system according to Supplementary note 14,
wherein the first base station notifies, when a sub-carrier is newly added by the second base station upon the handover, third difference information on a difference between the third control information and fourth control information to the mobile station through the main carrier, the fourth control information being set by the second base station for communication using the added sub-carrier and
wherein the mobile station reproduces the fourth control information by using the third control information and the third difference information.

(Supplementary Note 16)

The communication control system according to Supplementary note 12 or 13, further comprising:
a second base station that is placed adjacent to the first base station,
wherein the first base station transmits and receives, when the mobile station is located in an area where the mobile station can communicate with both of the first and second base stations, a part of the plurality of sub-carriers to and from the mobile station, and instructs the second base station to transmit and receive remaining sub-carriers to and from the mobile station.

(Supplementary Note 17)

The communication control system according to Supplementary note 16, wherein each of the first and second base stations selects, in accordance with a type of data to be relayed between the mobile station and a switching center, carriers used for the relay from among the main carrier and the plurality of sub-carriers.

(Supplementary Note 18)

The communication control system according to Supplementary note 17, wherein when the remaining sub-carriers are selected, the first base station transfers, to the second base station, data to be transmitted to the mobile station through the remaining sub-carriers, and the second base station transfers, to the first base station, data received from the mobile station through the remaining sub-carriers.

(Supplementary Note 19)

A method of controlling communication in a base station that simultaneously transmits and receives a main carrier and at least a part of a plurality of sub-carriers to wirelessly communicate with a mobile station, the method comprising:

notifying, to the mobile station through the main carrier, first control information for communication using a first sub-carrier, and first difference information on a difference between the first control information and second control information for communication using each of other sub-carriers.

(Supplementary Note 20)

A method of controlling communication in a mobile station that simultaneously transmits and receives a main carrier and a plurality of sub-carriers to wirelessly communicate with one or more base stations, the method comprising:

receiving, from one base station through the main carrier, first control information for communication using a first sub-carrier, and first difference information on a difference between the first control information and second control information for communication using each of other sub-carriers; and reproducing the second control information by using the first control information and the first difference information.

REFERENCE SIGNS LIST 1, 1A, 1B Communication Control System
10A, 10B Base Station
11, 21 Radio Communicator
12, 22 Controller
13 X2/S1 Interface Unit
20 Mobile Station
100, 100a, 100b PCC
101, 101a, 101b SCC (or PCC)
102, 102a, 102b, 103, 103a, 103b SCC
200-202, 301-303 Control Information
401-404 Difference Information
500 Table for Determining Used Carrier

The invention claimed is:

1. A base station comprising:
a first radio communicator that transmits and receives information using both a main carrier and a plurality of sub-carriers, thereby wirelessly communicating with a mobile station; and
a controller that controls the first radio communicator,
wherein the controller is configured to cause the first communicator to transmit, to the mobile station using the main carrier, first control information for communication using a first sub-carrier, and first difference information comprising a difference between the first control information and second control information for communication using at least one sub-carrier different from the first sub-carrier, wherein a size of the first difference information is smaller than a size of the second control information.

2. The base station according to claim 1, wherein the controller is configured to cause, in a case in which the first radio communicator begins to transmit and receive information via the plurality of sub-carriers, the first communicator to multiplex the first control information and the first difference information.

3. A base station comprising:
a first radio communicator that transmits and receives information using both a main carrier and a plurality of sub-carriers, thereby wirelessly communicating with a mobile station; and
a controller that controls the first radio communicator,
wherein the controller is configured to cause the first communicator to transmit, to the mobile station using the main carrier, first control information for communication using a first sub-carrier, and first difference information comprising a difference between the first control information and second control information for communication using at least one sub-carrier different from the first sub-carrier,
the base station further comprising:
a second communicator that is controlled by the controller, and that communicates with a different base station,
wherein the controller is further configured to:
control the second communicator to acquire, in a case a handover of the mobile station to the different base station and in which the different base station is to transmit and receive information to the mobile station using at least one of the plurality of sub-carriers used by the base station, second difference information comprising a difference between the first control information and third control information, wherein the third control information is determined by the different base station for communication using the at least one of the plurality of sub-carriers and wherein a size of the second difference information is smaller than a size of the third control information; and
cause the first communicator to transmit the second difference information to the mobile station using the main carrier.

4. The base station according to claim 3, wherein the controller is further configured to:
control the second communicator to acquire, when a sub-carrier is newly added by the different base station upon the handover, third difference information on a difference between the third control information and fourth control information, wherein the fourth control information is determined by the different base station for communication using the newly added sub-carrier and wherein a size of the third difference information is smaller than a size of the fourth control information; and
cause the first communicator to transmit the third difference information to the mobile station using the main carrier.

5. A base station comprising:
a first radio communicator that transmits and receives information using both a main carrier and a plurality of sub-carriers, thereby wirelessly communicating with a mobile station; and
a controller that controls the first radio communicator,
wherein the controller is configured to cause the first communicator to transmit, to the mobile station using the main carrier, first control information for communication using a first sub-carrier, and first difference information comprising a difference between the first control information and second control information for communication using at least one sub-carrier different from the first sub-carrier, the base station further comprising:
a second communicator that is controlled by the controller, and that communicates with a different base station,
wherein the controller is further configured to:
cause, in a case in which the mobile station is located in an area in which the mobile station can communicate with both of the base station and a different base station, the first communicator to transmit and receive information to and from the mobile station using at least one of the plurality of sub-carriers; and
control the second communicator to instruct the different base station to transmit and receive information to and from the mobile station using at least one of the plurality of sub-carriers different from the at least one of the plurality of sub-carriers used by the first communicator.

6. The base station according to claim 5, wherein the controller is further configured to select, in accordance with a type of data to be relayed between the mobile station and a switching center, carriers used for the relay from among the main carrier and the plurality of sub-carriers.

7. The base station according to claim 6, wherein when the remaining sub-carriers are selected, the controller is further configured to cause the second communicator to:
transfer, to the different base station, data to be transmitted to the mobile station using the at least one of the plurality of sub-carriers different from the at least one of the plurality of sub-carriers used by the first communicator; and
acquire data received by the different base station from the mobile station using the at least one of the plurality of sub-carriers different from the at least one of the plurality of sub-carriers used by the first communicator.

8. A mobile station comprising:
a communicator that transmits and receives information using both a main carrier and a plurality of sub-carriers, thereby wirelessly communicating with at least one base station; and
a controller that controls the communicator,
wherein the controller is configured to:
receive, from one base station using the main carrier, first control information for communication using a first sub-carrier, and first difference information comprising a difference between the first control information and second control information for communication using at least one sub-carrier different from the first sub-carrier, wherein a size of the first difference information is smaller than a size of the second control information; and
reproduce the second control information by using the first control information and the first difference information.

9. A mobile station comprising:
a communicator that transmits and receives information using both a main carrier and a plurality of sub-carriers, thereby wirelessly communicating with at least one base station; and
a controller that controls the communicator,
wherein the controller is configured to:
receive, from one base station using the main carrier, first control information for communication using a first sub-carrier, and first difference information comprising a difference between the first control information and second control information for communication using at least one sub-carrier different from the first sub-carrier; and
reproduce the second control information by using the first control information and the first difference information,
wherein the communicator is further configured to receive, from the base station using the main carrier, in a case of a handover of the mobile station to a different base station which communicates using the at least one sub-carrier used by the base station, second difference information comprising a difference between the first control information and third control information, wherein the third control information is determined by the different base station for communication using the at least one sub-carrier, and a size of the second difference information is smaller than a size of the third control information and
wherein the controller is further configured to reproduce the third control information by using the first control information and the second difference information.

10. A communication control system comprising:
a first base station; and
a mobile station that transmits and receives information using both a main carrier and a plurality of sub-carriers, thereby wirelessly communicating with the first base station,
wherein the first base station transmits, to the mobile station using the main carrier, first control information for communication using a first sub-carrier, and first difference information comprising a difference between the first control information and second control information for communication using at least sub-carrier different from the first sub-carrier, wherein a size of the first difference information is smaller than a size of the second control information, and
wherein the mobile station reproduces the second control information by using the first control information and the first difference information.

* * * * *